United States Patent
Shoup (10) Patent No.: US 6,352,125 B1
(45) Date of Patent: Mar. 5, 2002

(54) SIDE-BY-SIDE THREE-POINT HITCH

(76) Inventor: Kenneth E. Shoup, P.O. Box 121, Bonfield, IL (US) 60913

( * ) Notice: Subject to any disclaimer, the term of this patent is extended or adjusted under 35 U.S.C. 154(b) by 0 days.

(21) Appl. No.: 09/465,874

(22) Filed: Dec. 16, 1999

(51) Int. Cl.⁷ .............................................. A01B 56/06
(52) U.S. Cl. ...................... 172/446; 172/451; 172/439; 172/776
(58) Field of Search ................... 172/439, 446, 172/451, 677, 776; 280/472, 456.1

(56) References Cited

U.S. PATENT DOCUMENTS

| | | | |
|---|---|---|---|
| 3,177,639 A | * 4/1965 | Hardee | 172/451 |
| 3,989,272 A | * 11/1976 | McCanse et al. | 172/446 |
| 4,060,254 A | 11/1977 | Ernst | |
| 4,113,029 A | 9/1978 | Ramsower | |
| 4,180,133 A | 12/1979 | Collogan et al. | |
| 4,195,860 A | * 4/1980 | Helams | 172/446 |
| 4,262,921 A | 4/1981 | Dwyer | |
| 4,620,381 A | 11/1986 | Plyler et al. | |
| 4,677,922 A | * 7/1987 | Shrull et al. | 111/52 |
| 4,753,297 A | * 6/1988 | Mayeda et al. | 172/4 |
| 4,771,713 A | 9/1988 | Kinzenbaw | |
| 5,156,219 A | 10/1992 | Schmidt et al. | |
| 5,181,572 A | * 1/1993 | Anderson et al. | 172/6 |
| 5,303,662 A | 4/1994 | Drake | |
| 5,392,863 A | 2/1995 | Fixemer | |
| 5,413,182 A | * 5/1995 | Kromminga et al. | 172/776 |
| 5,603,380 A | 2/1997 | Mansur | |
| 5,743,341 A | * 4/1998 | Wattonville | 172/451 |
| 5,762,146 A | 6/1998 | Andrews | |

FOREIGN PATENT DOCUMENTS

| | | | | |
|---|---|---|---|---|
| DE | 1006193 | * | 4/1957 | 172/446 |
| FR | 2561853 | * | 10/1985 | 172/446 |
| GB | 807867 | * | 1/1959 | 172/446 |

* cited by examiner

Primary Examiner—Thomas B. Will
Assistant Examiner—Nathan Mammen
(74) Attorney, Agent, or Firm—Emrich & Dithmar (57) ABSTRACT

Apparatus for maintaining a tool bar in a controlled position behind a tractor having a conventional three-point hitch arrangement including an upper arm and a pair of lower lift arms. The apparatus has a tool bar positioned near the tractor extending in a direction generally perpendicular to a line of travel of the tractor and at least two upper mounts laterally spaced apart and fixedly connected to the tool bar for pivotal connection to the upper arm of the conventional three-point hitch. Each of the upper mounts has at least one apertured plate, and multiple spaced apart lower mounts laterally spaced apart and fixedly connected to the tool bar are associated with each upper mount for pivotal connection to the lower lift arms of the conventional three-point hitch. Connection of the tractor to one of the upper mounts and the multiple lower mounts associated therewith provide the tool bar with a first centerline and connection of the tractor to another of the upper mounts and the multiple lower mounts associated therewith provide the tool bar with a second centerline spaced from the first centerline one-half the lateral distance between crop rows.

17 Claims, 6 Drawing Sheets

SIDE-BY-SIDE THREE-POINT HITCH

BACKGROUND OF THE INVENTION

The present invention relates to agricultural planters and more particularly, it relates to a row crop planter which is capable of planting crops working the land for a specific crop spacing and is easily indexable one-half the distance between the crop rows for fertilizing or applying herbicide or other chemical intermediate the crop rows while the wheels of the tractor and/or wagon pulled behind the associated tool bar still travel down the original path, thereby leaving planted crops in tact.

Most farmers have switched to tool bar implement combinations in which various ground engaging implements, otherwise known as shanks, are mounted on the tool bar. In some cases, both front and rear tool bars are used and may have a variety of implements or equipment mounted thereon, such as seed hoppers, hoppers for insecticide, herbicide or fertilizer. Additionally, various soil openers and closers and gauge wheels may be mounted on the tool bar. Accordingly, it is extremely time consuming and undesirable to move all of the ground engaging equipment laterally along the bar in order to introduce fertilizer, herbicide or insecticide between rows previously planted.

SUMMARY OF THE INVENTION

In accordance with the present invention, there is provided a relatively simple and easy mechanism to index a tool bar approximately one-half the distance between the crop rows to enable the tractor or other prime mover to pull the tool bar through the field with the wheels of the tractor traveling the same lines as previously while the ground engaging equipment is indexed laterally one half row.

The mechanism for achieving this useful result are side-by-side hitches which are preferably permanently mounted to the tool bar and enable the tractor to be indexed a distance equal to one half the distance between crops, the distance between the center lines of the two hitches, while maintaining substantially all the ground engaging equipment mounted on the tool bar in a single position. Moreover, a fertilizer, insecticide or herbicide containing wagon pulled behind the tractor will also travel in the same paths as originally since it too will be moved a corresponding one half row with the prime mover.

An object of the present invention is to provide a simple and reliable mechanism for indexing entire tool bars one half a crop row distance for application of fertilizer, herbicide, insecticide or other materials after a crop has been planted without damaging the crop.

Another object of the present invention is to provide an apparatus for maintaining an implement including a tool bar in a controlled position behind a prime mover having a conventional three-point hitch arrangement including an upper arm and a pair of lower lift arms, the apparatus comprising a tool bar positioned near the primer mover extending in a direction generally perpendicular to a line of travel of the prime mover, at least two upper mounts fixedly connected to the tool bar for pivotal connection to the upper arm of the conventional three-point hitch arrangement, spaced apart lower mounts fixedly connected to the tool bar in association with each upper mount for pivotal connection to the lower lift arms of the conventional three-point hitch arrangement, connection of the prime mover to one of the upper mounts and the lower mounts associated therewith providing the tool bar with a first centerline and connection of the prime mover to another of the upper mounts and the lower mounts associated therewith providing the tool bar with a second centerline spaced from the first centerline one-half the lateral distance between crop rows.

A still further object of the present invention is to provide an apparatus for maintaining an implement including a tool bar in a controlled position behind a prime mover having a conventional three-point hitch arrangement including an upper arm and a pair of lower lift arms, the apparatus comprising a tool bar positioned near the primer mover extending in a direction generally perpendicular to a line of travel of the prime mover, at least two upper mounts laterally spaced apart and fixedly connected to the tool bar for pivotal connection to the upper arm of the conventional three-point hitch arrangement, each of the upper mounts including at least one apertured plate, multiple spaced apart lower mounts laterally spaced apart and fixedly connected to the tool bar in association with each upper mount for pivotal connection to the lower lift arms of the conventional three-point hitch arrangement, each of said lower mounts including at least one apertured plate, connection of the prime mover to one of the upper mounts and the multiple lower mounts associated therewith providing the tool bar with a first centerline and connection of the prime mover to another of the upper mounts and the multiple lower mounts associated therewith providing the tool bar with a second centerline spaced from the first centerline one-half the lateral distance between crop rows.

A final object of the invention is to provide an apparatus for maintaining an implement including front and rear tool bars in a controlled position behind a prime mover having a conventional three-point hitch arrangement including an upper arm and a pair of lower lift arms, the apparatus comprising a front tool bar positioned near the primer mover extending in a direction generally perpendicular to a line of travel of the prime mover, a rear tool bar positioned aft of the front tool bar and parallel thereto, at least two upper mounts fixedly connected to the front and rear tool bars for pivotal connection to the upper arm of the conventional three-point hitch arrangement, each of the upper mounts including laterally spaced apart plates having horizontally aligned apertures therein, spaced apart lower mounts fixedly connected to the front tool bar in association with each upper mount for pivotal connection to the lower lift arms of the conventional three-point hitch arrangement, each of the lower mounts including a pair of laterally spaced apart plates having horizontally aligned apertures therein, connection of the prime mover to one of the upper mounts and the lower mounts associated therewith providing the tool bar with a first centerline and connection of the prime mover to another of the upper mounts and the lower mounts associated therewith providing the tool bar with a second centerline spaced from the first centerline one-half the lateral distance between crop rows.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

The present invention together with the above and other objects and advantages may best be understood from the following detailed description of the embodiment of the invention illustrated in the drawings, wherein.

DESCRIPTION OF THE PREFERRED EMBODIMENT

Referring now to the drawings, there is disclosed an agricultural device 10 which includes a tractor or prime mover 15 having a chassis 16 with front wheels 17 and rear or drive wheels 18, all as known in the art.

A front tool bar 20 is preferably made out of square or rectangular tubular steel stock 21 and rear tool bar 25 is also made out of square or rectangular tubular bar stock 26. The front tool bar 20 and the rear tool bar 25 are positioned parallel to each other extending laterally of the tractor 15, all as is common. Mounted on the front tool bar 20 and rear tool bar 25 are a plurality of ground engaging implements or shanks 30 which may include openers, closers, seed depositing mechanisms as well as hoppers for containing insecticides, herbicides, fertilizers, seed and the like. Gauge wheels are also commonly mounted on the tool bars 20 and 25, but are not shown for purposes of clarity. Finally, wagon 35 is illustrated aft of the rear tool bar 25 and includes a chassis 36, wheels 37 and a forwarding extending frame member 38, all as is well known.

Figure 1:
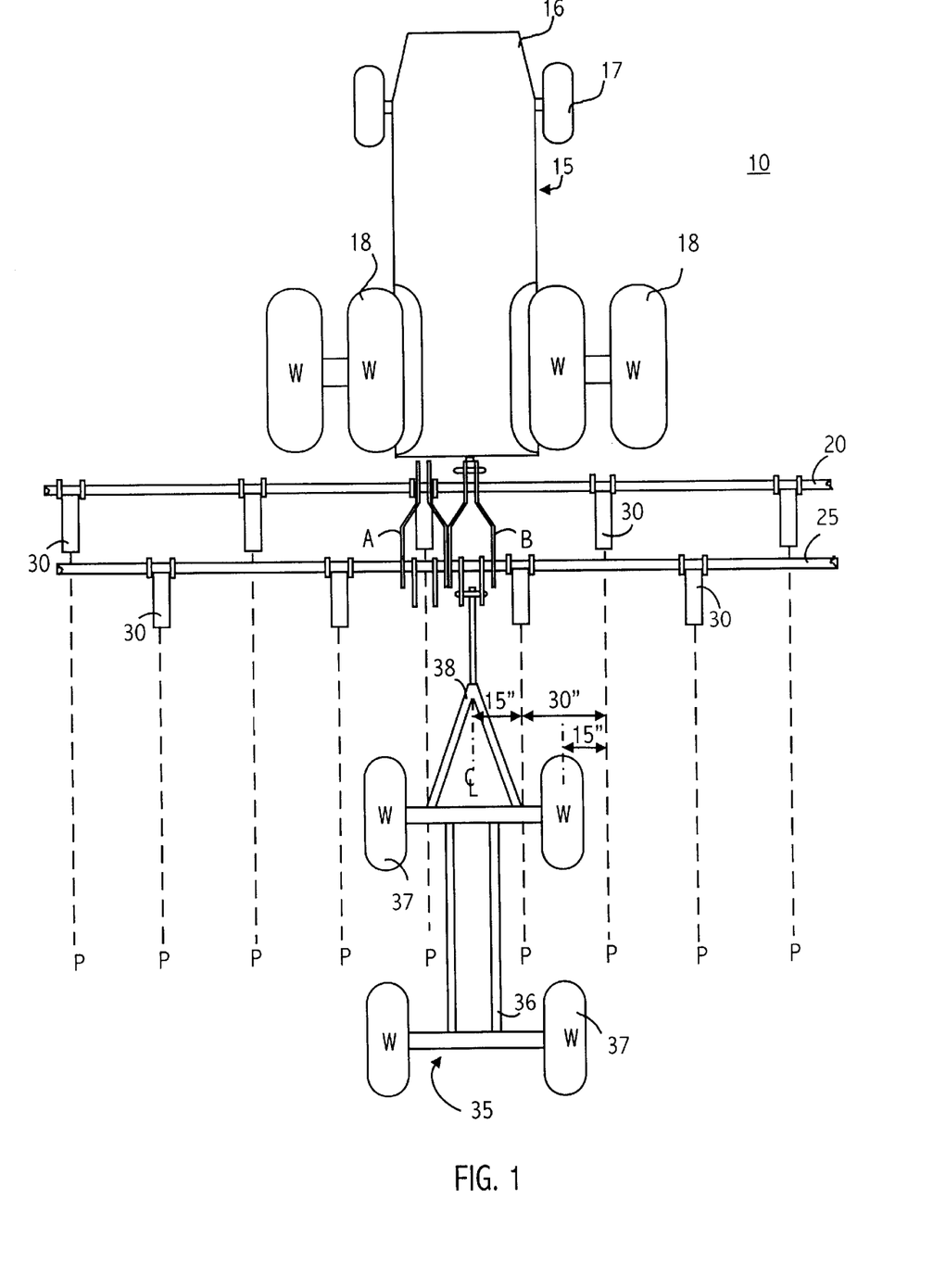
FIG. 1 is a schematic representation of a tractor or prime mover pulling multiple tool bars with a wagon behind it showing various ground engaging implements planting a crop.
Figure 2:
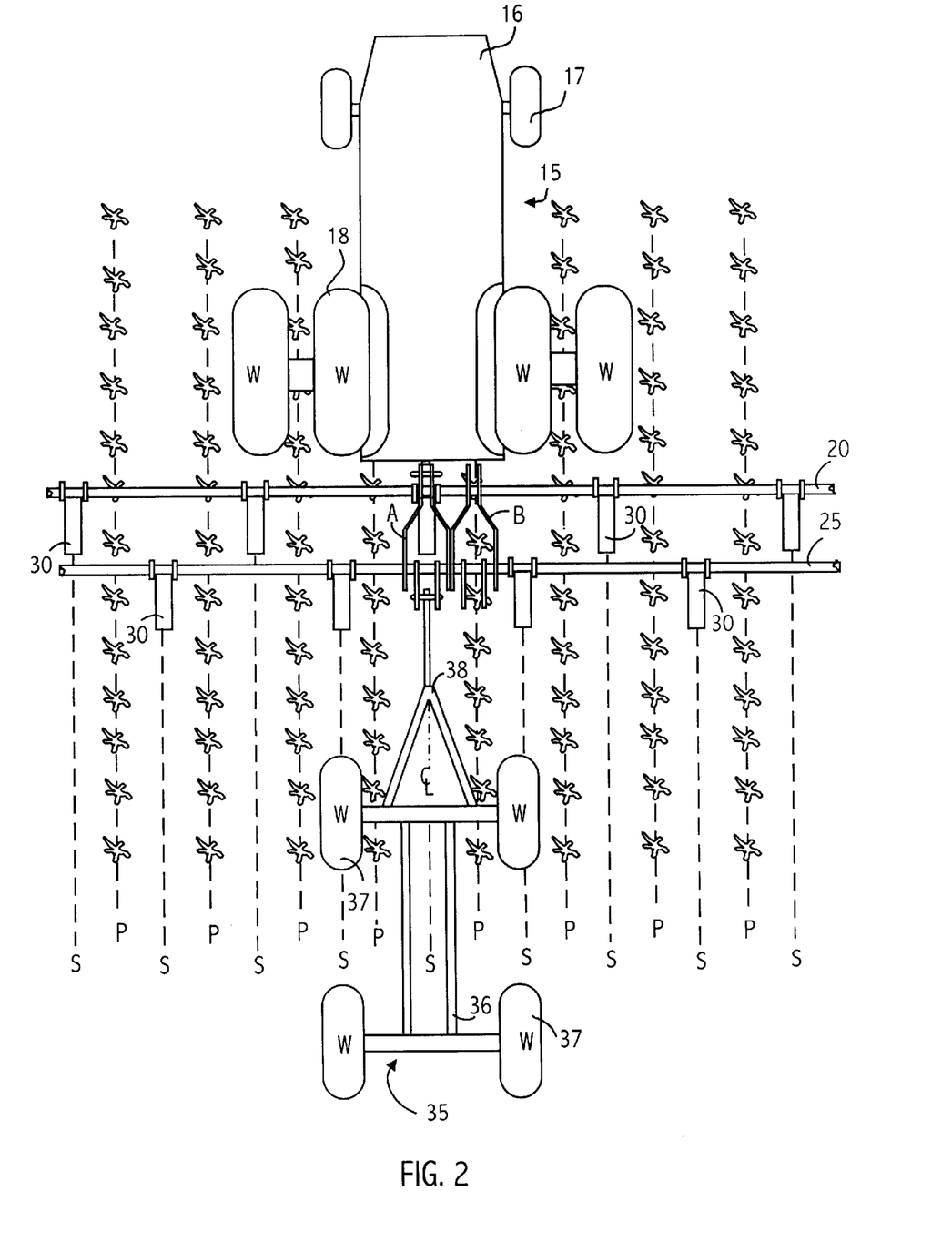
FIG. 2 is a schematic like FIG. 1 with the tractor and wagon indexed one half row from the original planting position with respect to the tool bar.

Referring to FIGS. 3–6, in addition to FIGS. 1 and 2, there is illustrated more specifically, multiple mounts for connection to a three point hitch on the standard agricultural tractor. More specifically, the invention relates to the use of a plurality of fixedly mounted mounts on the tool bar so that the tractor can be indexed in half crop width. While the invention broadly covers any number of mounts fixedly connected to a tool bar, the invention is illustrated for two permanently connected mounts. Each mount comprises an upper mount for pivotal connection to the usual upper arm of a three point hitch arrangement and each mount also has a pair of spaced lower mounts for pivotal connection to two or a pair of lower lift arms in a conventional three point hitch arrangement.

Figure 7:
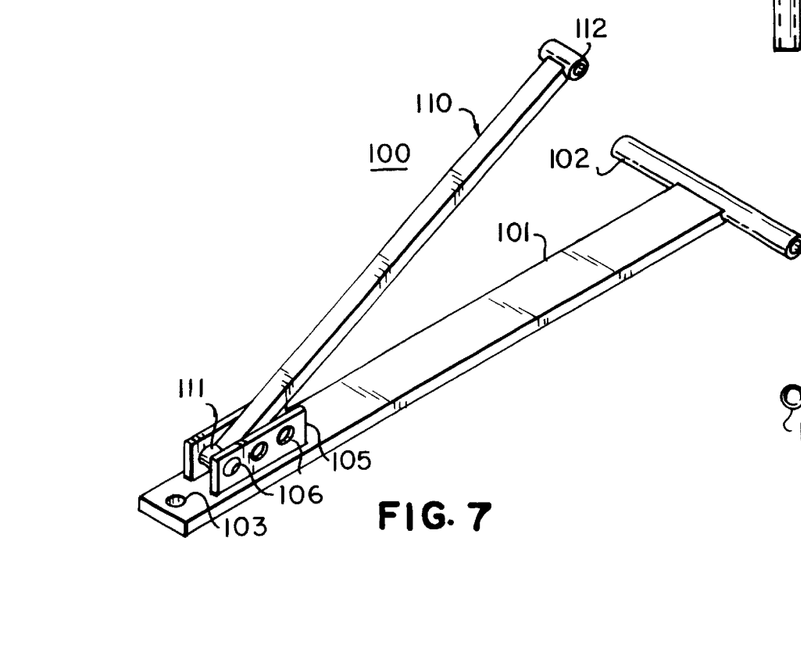
FIG. 7 is a perspective view of a wagon hitch used to connect the wagon to the rear tool bar mounting mechanism.

More specifically, upper mount 40A includes a trapezoidal plate 41A and a strap portion 51A, the trapezoidal plate 41A having a top edge 43A, a forward edge 45A and a juncture as illustrated in FIG. 7, 47A between the front tool bar 20 and the trapezoidal plate portion 41A. An aperture 49A is provided at the top forward end of the trapezoidal plate 41A. The strap portion 51A leads to a rear plate portion 53A which is welded as at 55A to the rear tool bar 25. Preferably, the plate 41A, strap 51A and plate 53A are a single unitary piece of steel. Parallel to the plate 41A is a plate 42A having the same general configuration and including a top edge 44A, a forward edge 46A, a juncture 48A with the front tool bar 20 and an aperture 49A coaxial with the other aperture 49A in the plate 41A. A rearwardly extending strap 52A extends to a plate 54A permanently connected as by welding to the rear tool bar 25. It should be noted that the lateral distance between the plates 41A and 42A is relatively close, whereas the straps 51A and 52A extend away from each other and intersect the rear tool bar 25 farther apart than the plates 41A and 42A. The invention is illustrated with front and rear tool bars 20 and 25, respectively, but is clearly applicable to be used with only one tool bar and is intended that the invention is not to be limited to those implements with two tool bars.

Associated with the upper mount 40A are a pair of lower mounts 60A and 70A which are spaced with respect to the mount 40A such that the mount 40A generally is midway between the lower mounts 60A and 70A. More specifically, the lower mount 60A includes a pair of generally triangular plates 61A and 62A, each having respectively a top edge or forwardly extending edge 63A and 64A. The plates 61A and 62A are permanently mounted to the front tool bar 20 such as by welding at the junctures respectively 67A and 68A and each of the plates 61A and 62A is provided with an aperture 69A at the forward leading end of the triangular plates 61A and 62A such that the apertures 69A are coaxial.

Similarly, a second lower mounting mechanism 70A is provided and includes parallel plates 71A and 72A of the same size, shape and dimension as plates 61A and 62A, each having a forward or leading edge 73A and 74A as previously described, a juncture 77A and 78A with the front tool bar 20 and apertures 79A coaxial with each other and with the apertures 69A. The upper mount 40A consisting of the two plates 41A and 42A along with the two lower mount 40A consisting of the two plates 41A and 42A along with the two lower mounts each including the pair of plates 61A and 62A and 71A and 72A cooperate so as to pivotally mount the tool bar 20 and associated tool bar 25 to the standard three point hitch on a tractor 15. A second set of upper mounts 40B and lower mounts 60B and 70B are illustrated in the drawings and are laterally positioned away from the first mount a distance equal to one half a crop row. For instance, if the crop being planted is corn at the traditional 30 inch row spacings, then the center line of mount 40A is 15 inches from the center line of mount 40B. This is illustrated by the dashed lines in FIGS. 1 and 2 which show the different spacings for the tool bar and the implements thereon when the tractor 15 is first mounted to mount 40A and the associated mounts 60A and 70A and thereafter indexed to be mounted, as illustrated in FIG. 2 to mount 40B and the associated lower mounts 60B and 70B. Like numbers have been applied to like parts with the difference between the two mounts being in the A and B designations.

Figure 3:
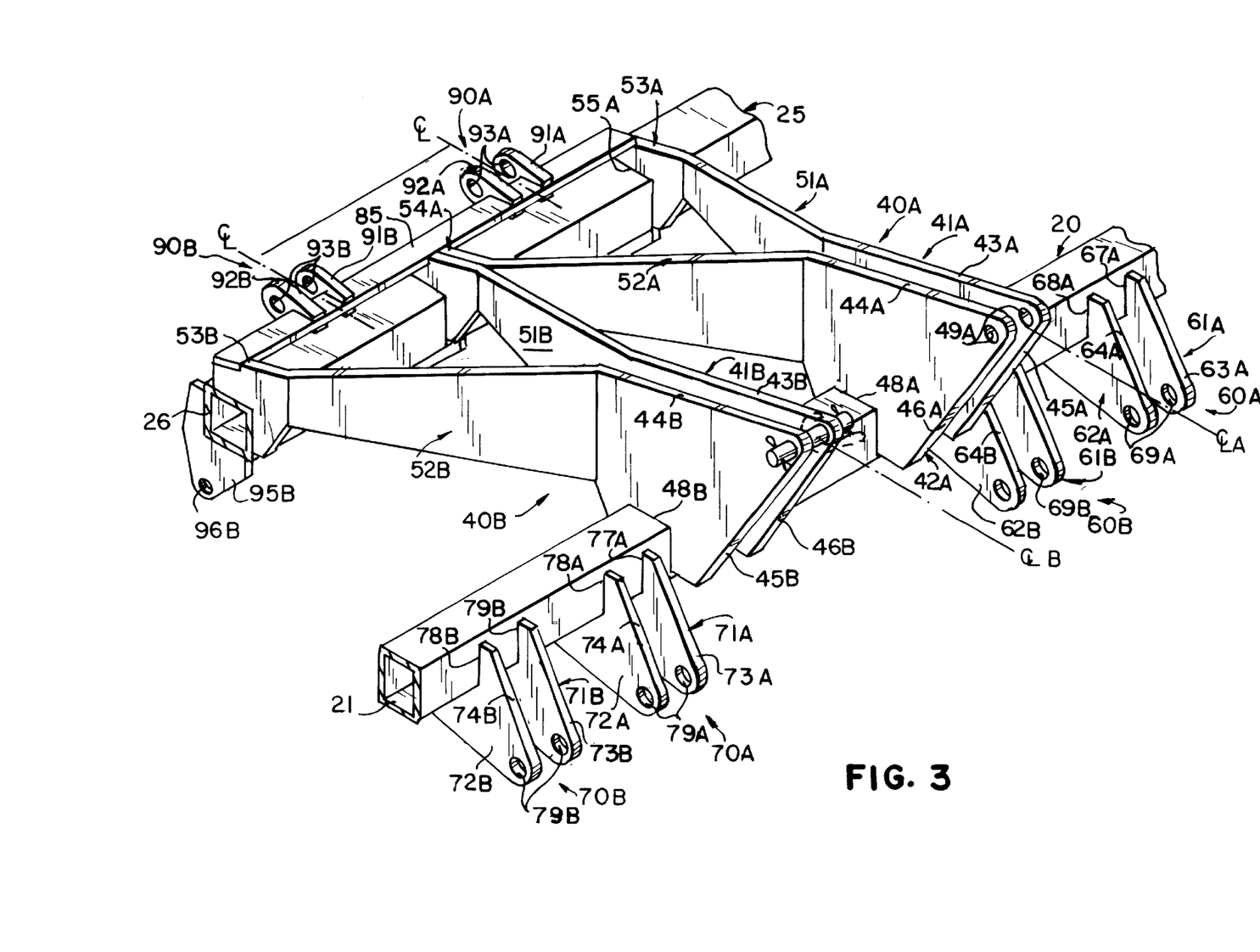
FIG. 3 is an enlarged prospective view of the multiple hitches used in combination with the three point hitch on the tractor.
Figure 4:
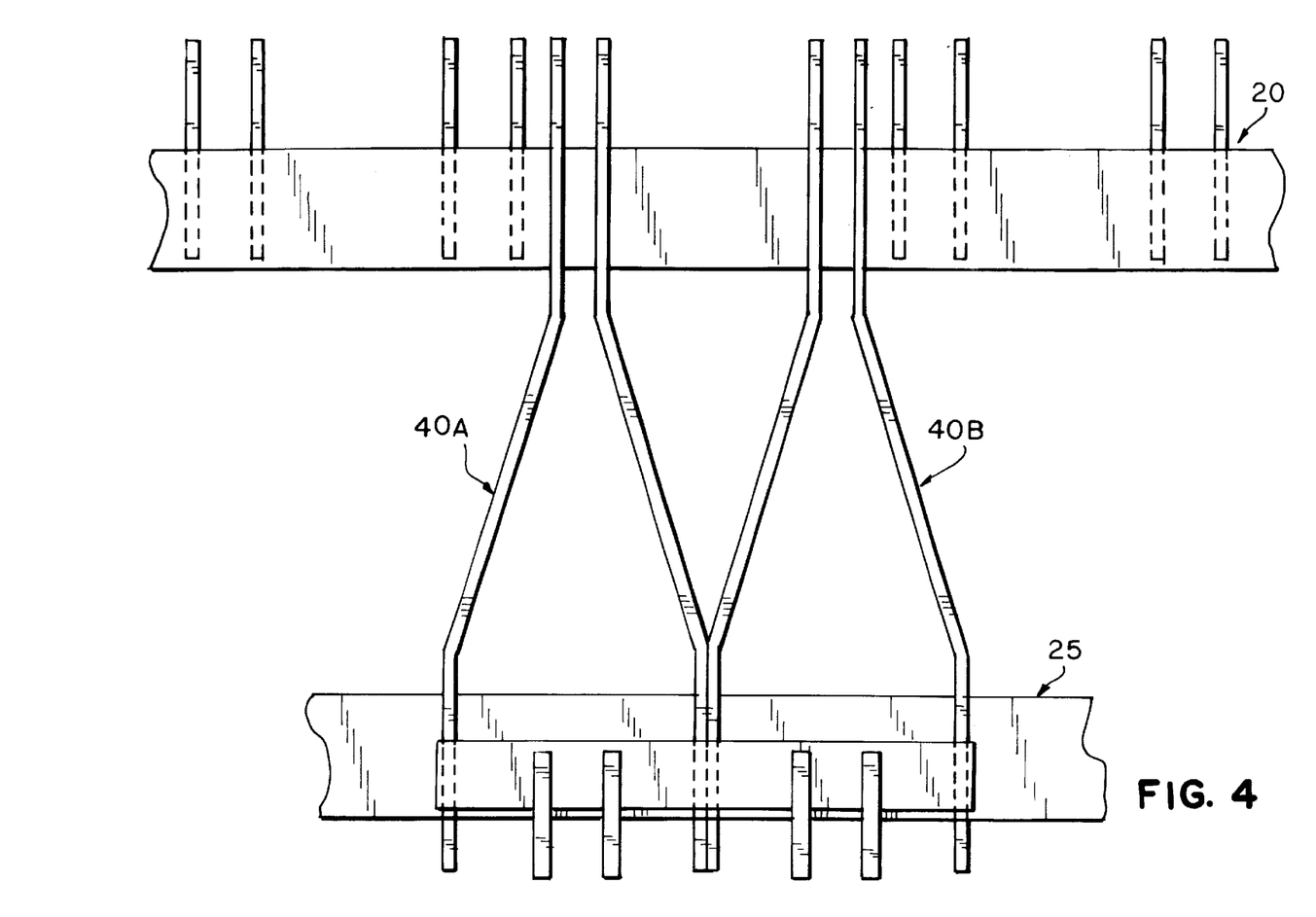
FIG. 4 is a top elevational view of the device illustrated in FIG. 3.
Figure 5:
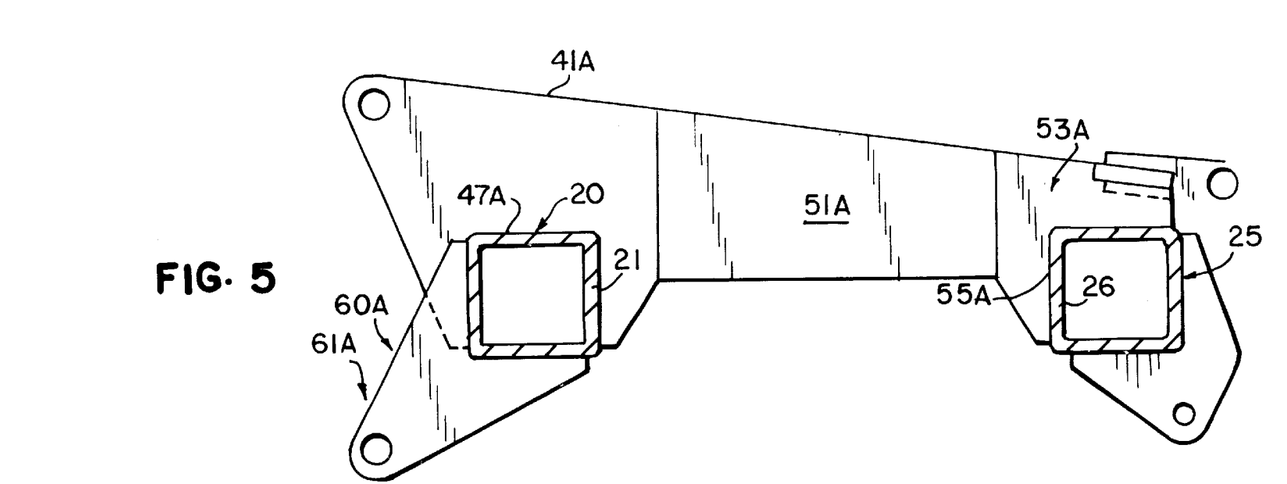
FIG. 5 is an elevational view from the right of the multiple hitches illustrated in FIG. 3.
Figure 6:
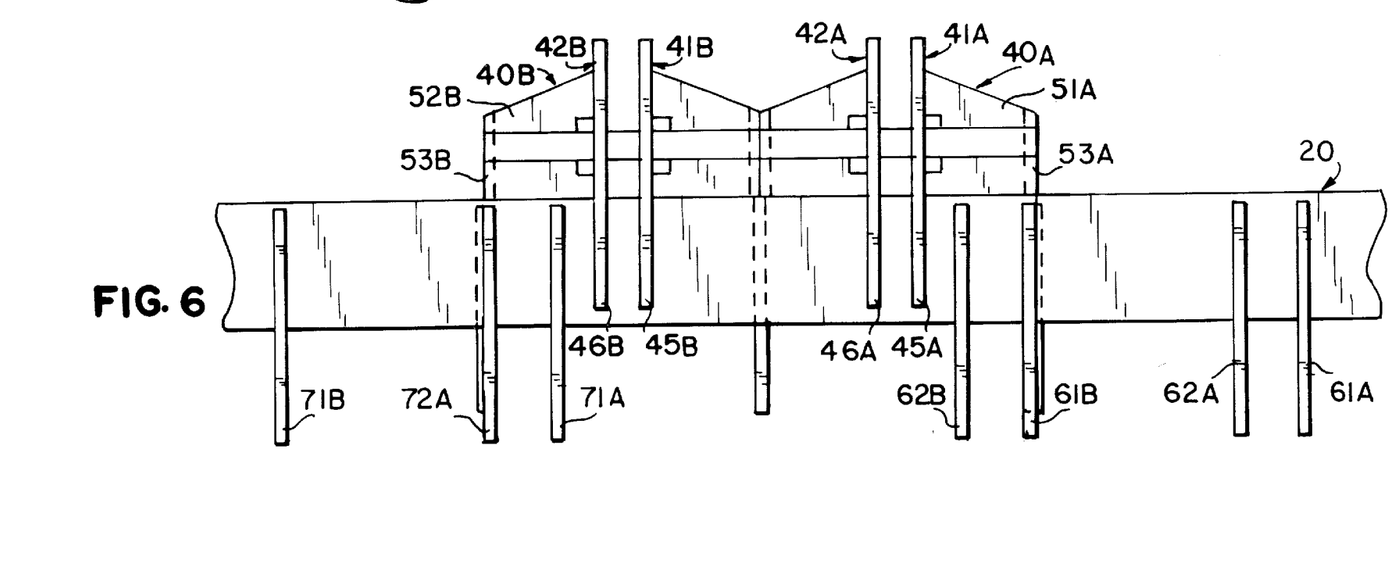
FIG. 6 is a front elevational view of the multiple hitches illustrated in FIG. 3.
Figure 8:
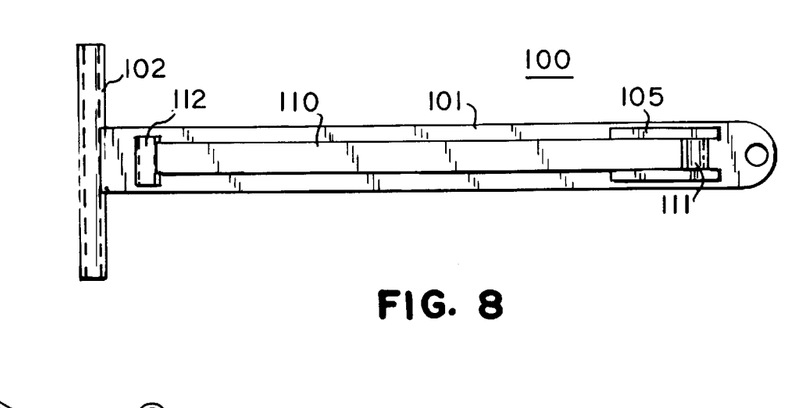
FIG. 8 is a top plan view of the wagon hitch illustrated in FIG. 7.
Figure 9:
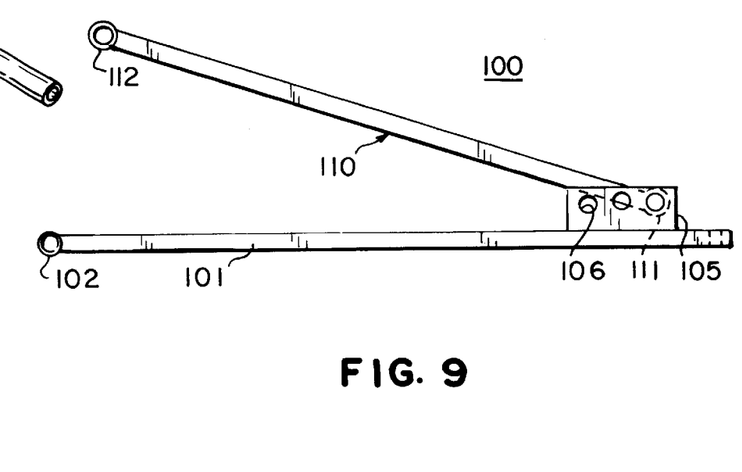
FIG. 9 is a side elevational view of the wagon hitch illustrated in FIG. 7.

As seen particularly in FIG. 3, a rear bar 85 is mounted across the plates 53A and 53B and carries thereon wagon hitches 90A and 90B. The wagon hitch 90A includes spaced apart tabs 91A and 92A, each provided with an associated aperture 93A coaxially arranged. Similarly, the wagon hitch 90B includes associated tabs 91B and 92B, each provided with an aperture 93B axially aligned with each other and with the apertures 93A to enable a wagon 35 to be pivotally mounted by a wagon hitch mechanism 100 to the rear tool bar 25. Downwardly extending plate 95B with aperture 96B is provided with a corresponding "A" plate, not shown, to connect the wagon hitch mechanism 100 to the tool bar 25. The wagon hitch mechanism 100 is illustrated in FIGS. 7–9 and is standard in the field and includes a draw bar 101 having a cross tube 102 for connection to the plates 95A and the apertures 96A and B.

The wagon hitch 100 further includes a clevis 105 which is a pair of plates welded to a draw bar 101 having a plurality of longitudinally extending adjustment apertures 106. A stabilizer bar 110 is pivotally mounted to the clevis 105 at one end 111, and provided with a mounting tube 112 for connection to the wagon hitches 90A and 90B, respectively. Accordingly it will be seen that a wagon hitch 100 can be indexed along with the prime mover 15, so that the wagon 35 is always aligned along the center line of the tractor 15.

Referring to FIG. 1, for purposes of illustration only, the hitch 40A may be used in the Fall to fertilize and in the Spring to condition the land and side dress fertilizer along the rows mark "P" in FIGS. 1 and 2. Thereafter, when the hitch B is utilized to index the tractor 15 and the wagon 35, a half crop row over, the wheels of the tractor 15 and wagon 35 will travel along the same paths as with mount 40A, but the ground engaging implements 30 will be indexed a one half row width from their original position, thereby to apply insecticide, herbicide, fertilizer or any other desired material along rows S, also known as side dressing, while the tractor 15 and wagon 35 may be pulled through the field without damaging previously planted crops. When the tool bars 20 and 25 are indexed to half row width, it may be necessary to add or subtract an extra row unit at the end of the tool bars 20 and 25 to balance the draft after the tool bars 20 and 25 have been indexed. Moreover, because one row will not be contacted at the end of the tool bar, a double portion of fertilizer or herbicide may need to be added by that end unit. However, this is all clear to one of ordinary skill in this art and virtues of the invention are also clear and enables the farmer to index tractor and associated equipment with a minimum expenditure of time and labor.

While there has been disclosed what is considered to be the preferred embodiment of the present invention, it is understood that various changes in the details may be made without departing from the spirit, or sacrificing any of the advantages of the present invention.

The embodiments of the invention in which an exclusive property or privilege is claimed are defined as follows:

1. Apparatus for maintaining an implement including a tool bar in a controlled position behind a prime mover having drive wheels defining a predetermined wheel base and a conventional three-point hitch arrangement including an upper arm and a pair of lower lift arms, said apparatus comprising a tool bar positioned near the prime mover extending in a direction generally perpendicular to a line of travel of the prime mover and beyond the predetermined wheel base, at least two upper mounts fixedly connected to said tool bar for pivotal connection to the upper arm of the conventional three-point hitch arrangement, spaced apart lower mounts fixedly connected to said tool bar in association with each upper mount for pivotal connection to the lower lift arms of the conventional three-point hitch arrangement, and a plurality of ground engaging implements attached to said tool bar laterally spaced therealong, connection of the prime mover to one of said upper mounts and the lower mounts associated therewith providing said tool bar with a first centerline and connection of the prime mover to another of said upper mounts and the lower mounts associated therewith providing said tool bar with a second centerline spaced from the first centerline one-half the lateral distance between crop rows, the draft of the prime mover being maintained along the center line of the prime mover by adding or subtracting a ground engaging implement at one end or the other of said tool bar.

2. The apparatus of claim 1, wherein the tool bar is tubular steel and square or rectangular in transverse cross-section.

3. The apparatus of claim 2, wherein said two upper mounts are laterally spaced apart from each other approximately one-half the distance between crop rows.

4. The apparatus of claim 3, wherein there are two of said lower mounts for each upper mount, each of said lower mounts being laterally spaced on said tool bar such that said upper mount substantially bisects the distance between said lower mounts.

5. The apparatus of claim 4, wherein said upper and lower mounts are welded to said tool bar.

6. Apparatus for maintaining an implement including a tool bar in a controlled position behind a prime mover having drive wheels defining a predetermined wheel base and a conventional three-point hitch arrangement including an upper arm and a pair of lower lift arms, said apparatus comprising a tool bar positioned near the primer mover extending in a direction generally perpendicular to a line of travel of the prime mover and beyond the predetermined wheel base, at least two upper mounts laterally spaced apart and fixedly connected to said tool bar for pivotal connection to the upper arm of the conventional three-point hitch arrangement, each of said upper mounts including at least one apertured plate, multiple spaced apart lower mounts laterally spaced apart and fixedly connected to said tool bar in association with each upper mount for pivotal connection to the lower lift arms of the conventional three-point hitch arrangement, each of said lower mounts including at least one apertured plate, and a plurality of ground engaging implements attached to said tool bar laterally spaced therealong, connection of the prime mover to one of said upper mounts and the multiple lower mounts associated therewith providing said tool bar with a first centerline and connection of the prime mover to another of said upper mounts and the multiple lower mounts associated therewith providing said tool bar with a second centerline spaced from the first centerline one-half the lateral distance between crop rows, the draft of the prime mover being maintained along the center line of the prime mover by adding or subtracting a ground engaging implement at one end or the other of said tool bar.

7. The apparatus of claim 6, wherein there are two spaced apart lower mounts for each upper mount.

8. The apparatus of claim 7, wherein each upper mount consists of two laterally spaced apart parallel apertured plates and each lower mount consists of two pair of laterally spaced apart parallel apertured plates.

9. The apparatus of claim 8, wherein said plates for said upper and lower mounts are welded to said tool bar.

10. Apparatus for maintaining an implement including front and rear tool bars in a controlled position behind a prime mover having drive wheels defining a predetermined wheel base and a conventional three-point hitch arrangement including an upper arm and a pair of lower lift arms, said apparatus comprising a front tool bar positioned near the prime mover and beyond the predetermined wheel base extending in a direction generally perpendicular to a line of travel of the prime mover, a rear tool bar positioned aft of the front tool bar and parallel thereto, at least two upper mounts fixedly connected to said front and rear tool bars for pivotal connection to the upper arm of the conventional three-point hitch arrangement, each of said upper mounts including laterally spaced apart plates having horizontally aligned apertures therein, spaced apart lower mounts fixedly connected to said front tool bar in association with each upper mount for pivotal connection to the lower lift arms of the conventional three-point hitch arrangement, each of said lower mounts including a pair of laterally spaced apart plates having horizontally aligned apertures therein and a plurality of ground engaging implements attached to said tool bar laterally spaced therealong, connection of the prime mover to one of said upper mounts and the lower mounts associated therewith providing said tool bar with a first centerline and connection of the prime mover to another of said upper mounts and the lower mounts associated therewith providing said tool bar with a second centerline spaced from the first centerline one-half the lateral distance between crop rows, the draft of the prime mover being maintained along the center line of the prime mover by adding or subtracting a ground engaging implement.

11. The apparatus of claim 10, wherein each of said upper mounts includes laterally spaced apart plates extending in part perpendicularly to the axial extent of said front tool bar and extend above said front tool bar and rearwardly thereof to said rear tool bar.

12. The apparatus of claim 11, wherein the lateral separation of each of said plates of said upper mount is greater at the connection to said rear tool bar than at the connection to said front tool bar.

13. The apparatus of claim 12, wherein the vertical extent of each of said plates of said upper mount is greater at the connection to said front tool bar than at said rear tool bar.

14. The apparatus of claim 13, wherein said rear tool bar is further provided with a pair of rearwardly extending wagon hitch members, each wagon hitch member being aligned with a centerline formed by each upper mount and the associated lower mounts.

15. The apparatus of claim 14, wherein each wagon hitch member includes two rearwardly extending apertured plates.

16. The apparatus of claim 15 and further including a plurality of laterally spaced apart ground engaging implements mounted on either or both of said front and rear tool bars.

17. Apparatus for maintaining an implement including front and rear tool bars in a controlled position behind a prime mover having a conventional three-point hitch arrangement including an upper arm and a pair of lower lift arms, said apparatus comprising a front tool bar positioned near the prime mover extending in a direction generally perpendicular to a line of travel of the prime mover, a rear tool bar positioned aft of the front tool bar and parallel thereto, at least two upper mounts fixedly connected to said front and rear tool bars for pivotal connection to the upper arm of the conventional three-point hitch arrangement, each of said upper mounts including laterally spaced apart plates extending in part perpendicularly to the axial extent of said front tool bar and extend above said front tool bar and rearwardly thereof to said rear tool bar, and having horizontally aligned apertures therein, the lateral separation of each of said plates of said upper mount being greater at the connection to said rear tool bar than at the connection to said front tool bar, the vertical extent of each of said plates of said upper mount being greater at the connection to said front tool bar than at said rear tool bar, spaced apart lower mounts fixedly connected to said front tool bar in association with each upper mount for pivotal connection to the lower lift arms of the conventional three-point hitch arrangement, each of said lower mounts including a pair of laterally spaced apart plates having horizontally aligned apertures therein, connection of the prime mover to one of said upper mounts and the lower mounts associated therewith providing said tool bar with a first centerline and connection of the prime mover to another of said upper mounts and the lower mounts associated therewith providing said tool bar with a second centerline spaced from the first centerline one-half the lateral distance between crop rows, a pair of rearwardly extending wagon hitch members on said rear tool bar, each wagon hitch members being aligned with a centerline formed by each upper mount and the associated lower mounts.

* * * * *